United States Patent
Lee et al.

(10) Patent No.: US 9,645,468 B2
(45) Date of Patent: May 9, 2017

(54) ELECTROPHORETIC DISPLAY DEVICE

(71) Applicant: E Ink Holdings Inc., Hsinchu (TW)

(72) Inventors: Tsung-Ting Lee, Hsinchu (TW);
Shuo-En Lee, Hsinchu (TW)

(73) Assignee: E Ink Holdings Inc., Hsinchu (TW)

(*) Notice: Subject to any disclaimer, the term of this patent is extended or adjusted under 35 U.S.C. 154(b) by 30 days.

(21) Appl. No.: 14/617,875

(22) Filed: Feb. 9, 2015

(65) Prior Publication Data
US 2015/0355522 A1 Dec. 10, 2015

(30) Foreign Application Priority Data

Jun. 4, 2014 (TW) .............................. 103119374 A

(51) Int. Cl.
*G02B 26/00* (2006.01)
*G02F 1/167* (2006.01)

(52) U.S. Cl.
CPC ...... *G02F 1/167* (2013.01); *G02F 2001/1676* (2013.01); *G02F 2201/52* (2013.01)

(58) Field of Classification Search
CPC ............... G02F 1/167; G02F 1/133514; G02F 2001/1676; G02F 2201/52; G02F 2201/123; G09G 3/344; G09G 2300/08; G09G 2300/0426; G09G 2300/0452; G09G 2310/0262; G02B 26/007; G02B 26/026
USPC .......................................................... 359/296
See application file for complete search history.

(56) References Cited

U.S. PATENT DOCUMENTS

| | | |
|---|---|---|
| 7,301,571 B2 | 11/2007 | Kobayashi et al. |
| 7,382,010 B2 | 6/2008 | Choi |
| 7,872,680 B2 | 1/2011 | Misawa |
| 2001/0031405 A1 | 10/2001 | Phillips |
| 2003/0137615 A1* | 7/2003 | Nakayoshi ........ G02F 1/136286 349/43 |

(Continued)

FOREIGN PATENT DOCUMENTS

| | | |
|---|---|---|
| JP | 61-282823 A | 12/1986 |
| JP | 7-261166 A | 10/1995 |

(Continued)

OTHER PUBLICATIONS

Corresponding Taiwanese Office Action that this art reference was cited on Sep. 24, 2015.

*Primary Examiner* — Mahidere Sahle
(74) *Attorney, Agent, or Firm* — CKC & Partners Co., Ltd.

(57) ABSTRACT

An electrophoretic display device includes a substrate, a plurality of first conductive lines, a plurality of second conductive lines, a plurality of active elements, a plurality of pixel electrode, an electrophoretic layer and a color resist layer. The first and second conductive lines are disposed over a surface of the substrate. The projections of the first and second conductive lines onto the surface constitute a plurality of geometric shapes. Each of the geometric shapes is a hexagon or a contour constructed of a plurality of hexagons adjoined together. Each of the active elements is electrically connected to one of the first conductive lines and one of the second conductive lines. Each of the pixel electrodes is electrically connected to one of the active elements. The electrophoretic layer is disposed over the pixel electrodes, and the color resist layer is disposed over the electrophoretic layer.

10 Claims, 13 Drawing Sheets

(56) References Cited

U.S. PATENT DOCUMENTS

| 2005/0099378 | A1* | 5/2005 | Kim | G02F 1/134309 |
|---|---|---|---|---|
| | | | | 345/99 |
| 2010/0177221 | A1 | 7/2010 | Lee | |
| 2011/0026097 | A1* | 2/2011 | Kwon | G02F 1/167 |
| | | | | 359/296 |

FOREIGN PATENT DOCUMENTS

| TW | 200510828 A | 3/2005 |
|---|---|---|
| TW | 201104329 A | 2/2011 |

\* cited by examiner

ELECTROPHORETIC DISPLAY DEVICE

RELATED APPLICATIONS

This application claims priority to Taiwanese Application Serial Number 103119374, filed Jun. 04, 2014, which is herein incorporated by reference.

BACKGROUND

Technical Field

The present disclosure relates to an electrophoretic display device. More particularly, the present invention relates to a color electrophoretic display device.

Description of Related Art

Conventional electrophoretic display devices display black and white colors only, and can not display colorful images. In order to display colorful images on electrophoretic display devices. manufacturers of electrophoretic display devices commit to develop a variety of technologies for obtaining color electrophoretic display device. For instance, many researchers have developed electrophoretic particles with color such that electrophoretic display devices may display colors. However, the driving voltages for electrophoretic particles with different colors are possibly different, which leads the electrophoretic display devices into a. complex structure and complex driving circuit. Therefore, many researchers develop other techniques to implement color electrophoretic display devices. For example, red, green and blue color resist layers are formed on the electrophoretic display panel. Photolithographic processes. are used in forming the pattern of the conventional color resist layer. However, this approach wastes a lot of color resist material and a large amount of developing solution is required. Accordingly, some manufacturers of display devices recently try to form red, green and blue color resist layers by inkjet techniques.

SUMMARY

An electrophoretic display device is provided. According to one aspect of the present disclosure, the electrophoretic display device includes a substrate, a plurality of first conductive wires, a plurality of second conductive wires, a plurality of active devices, a plurality of pixel electrodes, an electrophoretic layer and a color resist layer. The substrate has a principal surface. The first conductive wires are disposed over the principal surface of the substrate. The second conductive wires are disposed over the principal surface of the substrate and crossing over the first conductive wires. The projections of the first conductive wires and the second conductive wires on the principal surface constitute a plurality of geometric patterns, and each of the geometric patterns is a hexagon or a contour formed of a plurality of hexagons adjoined together. Each of the active devices is electrically connected to one of the first conductive wires and one of the second conductive wires. Each of the pixel electrodes is electrically connected to one of the active device. The electrophoretic layer is positioned over the pixel electrodes. The color resist layer is positioned over the electrophoretic layer.

According to another aspect of the present disclosure, the electrophoretic display device includes at least one first conductive wire, at least one second conductive wire, at least one active device, at least one pixel electrode, an electrophoretic layer and a color resist layer. The first conductive wire includes a plurality of first segments, a plurality of second segments, a plurality of third segments and a plurality of fourth segments. Each first segment is substantially parallel to each third segment. Two ends of each second segment are respectively connected with an end of each first segment and an end of each third segment. Further, each second segment and each first segment connected thereto form an included angle of about 120 degrees, and each second segment and each third segment connected thereto form an included angle of about 120 degrees. Additionally, two ends of each fourth segment are respectively connected with an end of each first segment and an end of each third segment. Each fourth segment and each first segment connected thereto form an included angle of about 120 degrees, and each fourth segment and each third segment form an included angle of about 120 degrees. In addition, the second conductive wire includes a plurality of fifth segments and a plurality of sixth. segments. Two ends of each fifth segment are respectively connected. to two adjacent ones of the sixth segments, and each fifth segment and each sixth segment connected thereto form an included angle of about 120 degrees. The active device is electrically connected to the first conductive wire and the second conductive wire. The pixel electrode is electrically connected to the active device. The electrophoretic layer is positioned over the pixel electrode. The color resist layer is positioned over the electrophoretic layer.

According to one embodiment of the present disclosure, the first conductive wire is a data line, and the second conductive wire is a gate line.

According to one embodiment of the present disclosure, the first conductive wire is a gate line, and the second conductive wire is a data line.

According to one embodiment of the present disclosure, the color resist layer includes a plurality of color resist patterns, and each of the color resist patterns has a circle-liked contour or an ellipse-liked contour.

According to one embodiment of the present disclosure, the electrophoretic display device further includes a third electrode wire, and the third electrode wire is mirror symmetric to the second conductive wire.

According to one embodiment of the present disclosure, each of the first segments and each of the third segments are of substantially equal length, and each of the second segments and each of the fourth segments are of substantially equal length.

According to one embodiment of the present disclosure, each of the fifth segments and each of the sixth segments are of substantially equal length.

According to one embodiment of the present disclosure, the pixel electrode has a pattern of a hexagon or a contour consisting of a plurality of hexagons adjoined together.

According to another aspect of the present disclosure, the electrophoretic display device includes a substrate, a plurality of first conductive wires, plurality of second conductive wires, a plurality of active devices, a plurality of pixel electrode, an electrophoretic layer and a color resist layer. The substrate has a principal surface. The first conductive wires are disposed over the principal surface of the substrate. The second conductive wires are disposed over the principal surface of the substrate and cross over the first conductive wires. The projections of the first conductive wires and the second conductive wires on the principal surface constitute a plurality of geometric patterns, and each of the geometric patterns is constructed of at least one regular dodecagon and a plurality of equilateral triangles arranged in a way constructing a tessellation. Each of the active devices is electrically connected to one of the first conductive wires and one of the second conductive wires. Each of the pixel electrodes is electrically connected to one of the active devices. The electrophoretic layer is positioned over the pixel electrodes. The color resist layer is positioned over the electrophoretic layer.

It is to be understood that both the foregoing general description and the following detailed description are by examples, and are intended to provide further explanation of the present disclosure as claimed.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and together with the description, serve to explain the principles of the present disclosure. In the drawings.

DESCRIPTION OF THE EMBODIMENTS

Figure 1A:
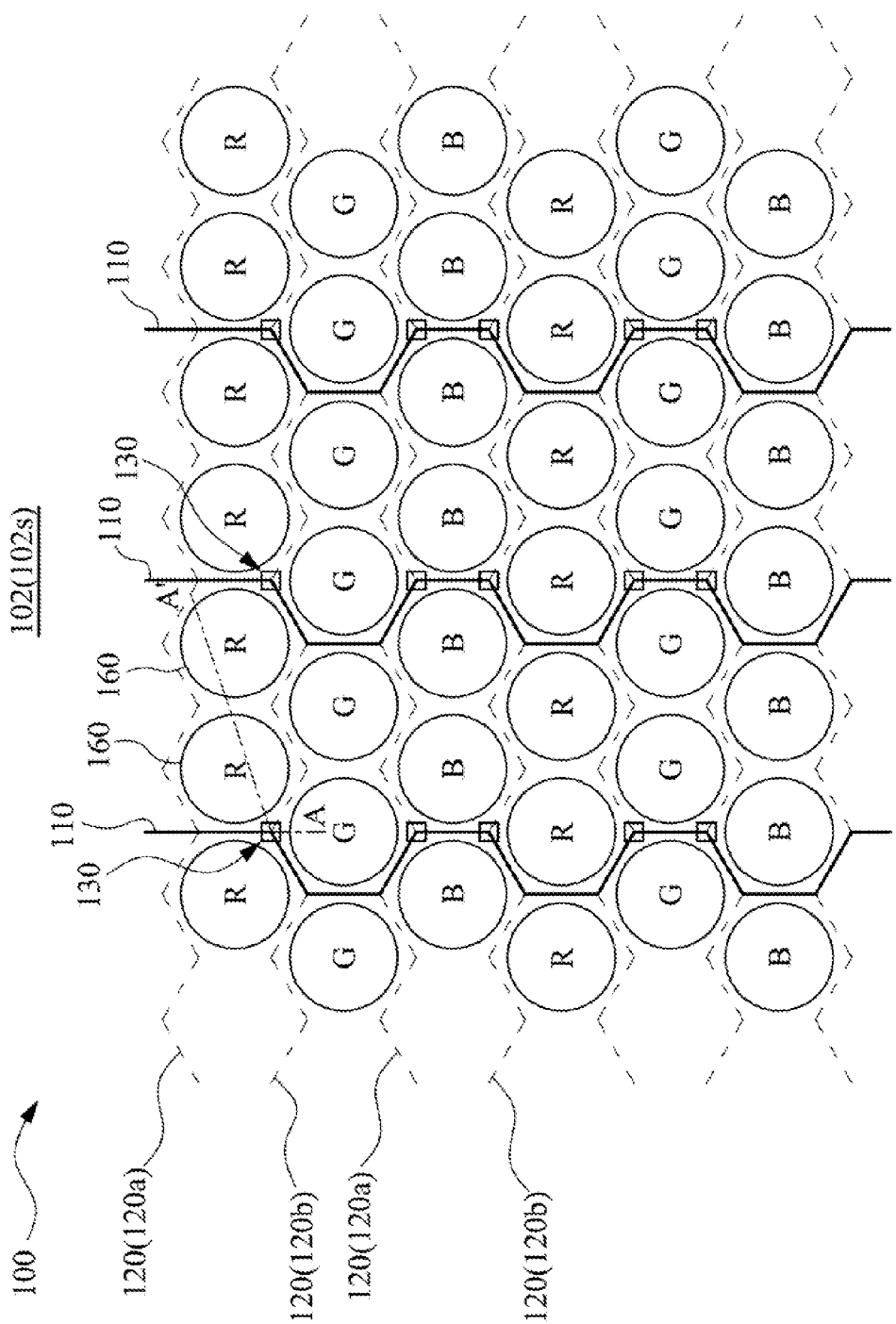
FIG. 1A and FIG. 1B are top views schematically illustrating an electrophoretic display device according to one embodiment of the present disclosure.

Reference will now be made in detail to the present embodiments of the present disclosure, examples of which are illustrated in the accompanying drawings. Wherever possible, the same reference numbers are used in the drawings and the description to refer to the same or like parts. In the following detailed description, for purposes of explanation, numerous specific details are set forth in order to provide a thorough understanding of the disclosed embodiments. It will he apparent, however, that one or more embodiments may be practiced without these specific details. In other instances, well-known structures and devices are schematically shown in order to simplify the drawings. As used herein, the term "about", "around", "approximately" or "substantially" shall generally mean within 20 percent, preferably within 10 percent. and more preferably within 5 percent of a given value or range. Numerical quantities given herein are approximate meaning that the term "around", "about" or "approximately" can be inferred if not expressly stated.

Figure 1B:
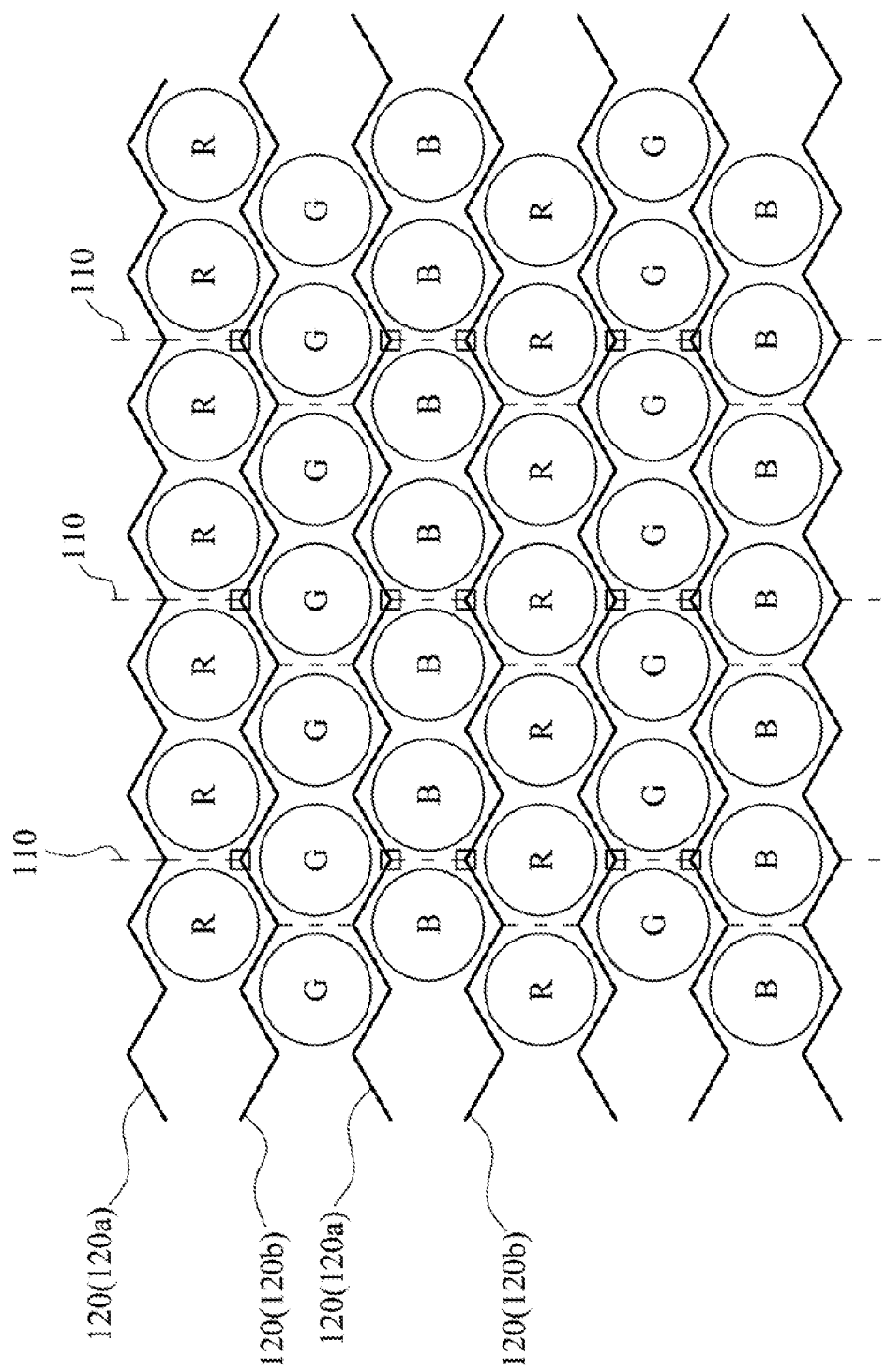

FIG. 1A and FIG. 1B are top views schematically illustrating an electrophoretic display device 100 according to one embodiment of the present disclosure. The electrophoretic display device 100 includes a substrate 102, a plurality of first conductive wires 110 and a plurality of second conductive wires 120. The substrate 102 may be a rigid substrate or a flexible substrate. For instance, the substrate 102 may be a glass substrate, a stainless steel substrate, a polyethylene terephthalate (PET) substrate, a polyethylene naphthalate (PEN) substrate, a polyimide substrate, a polycarbonate substrate, or an ultra-thin flexible glass substrate. The substrate 102 has a principal surface 102$s$, and other elements of the electrophoretic display device 100 are formed on the principal surface 102$s$.

The first conductive wires 110 and the second conductive wires 120 are disposed over the principal surface 102$s$, and the first conductive wires 110 cross over the second conductive wires 120. For the purpose of clearly illustrating the layout of the first conductive wires 110 and the second conductive wires 120 on the principal surface 102$s$, the first conductive wires 110 are shown by solid lines in FIG. 1A whereas the second conductive wires 120 are shown by dotted lines. In FIG. 1B, the second conductive wires 120 are shown by solid lines, and the first conductive wires 110 are shown by dotted lines. The first conductive wires 110 and the second conductive wires 120 may be data lines or gate lines, for example. According to various embodiments of the present disclosure, when the first conductive wires 110 are data lines, the second conductive wires 120 are gate lines. In contrast, when the first conductive wires 110 are gate lines, the second conductive wires 120 are data lines.

According to some embodiments of the present disclosure, the projections of the first conductive wires 110 and the second conductive wires 120 in combination on the principal surface 102$s$ constitute a plurality of repeated geometric patterns, and each of the geometric patterns is a hexagon or as contour constructed of a plurality of hexagons adjoined together, which is described in detail hereinafter.

Figure 1C:
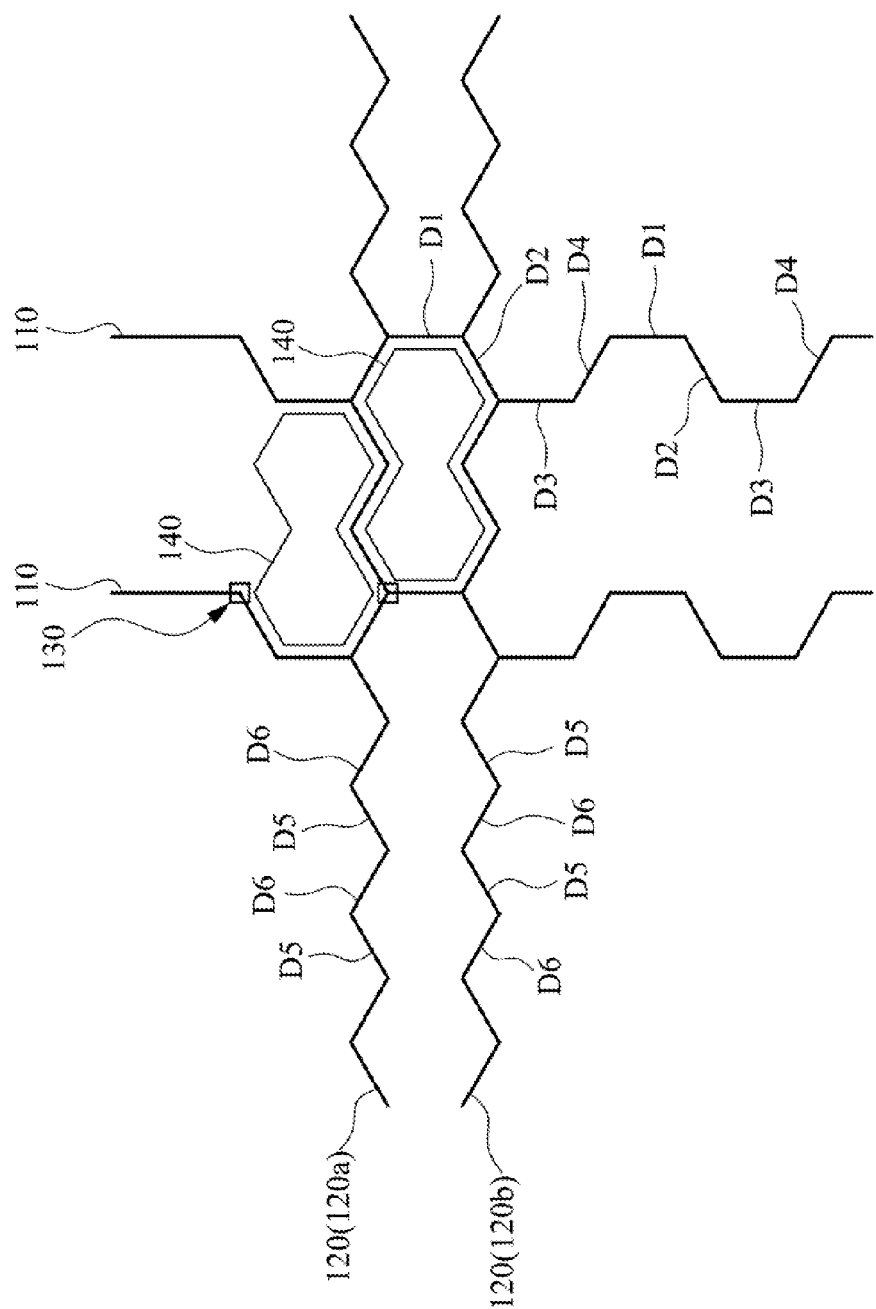
FIG. 1C is an enlarged view schematically illustrating parts of FIG. 1A.
Figure 1D:
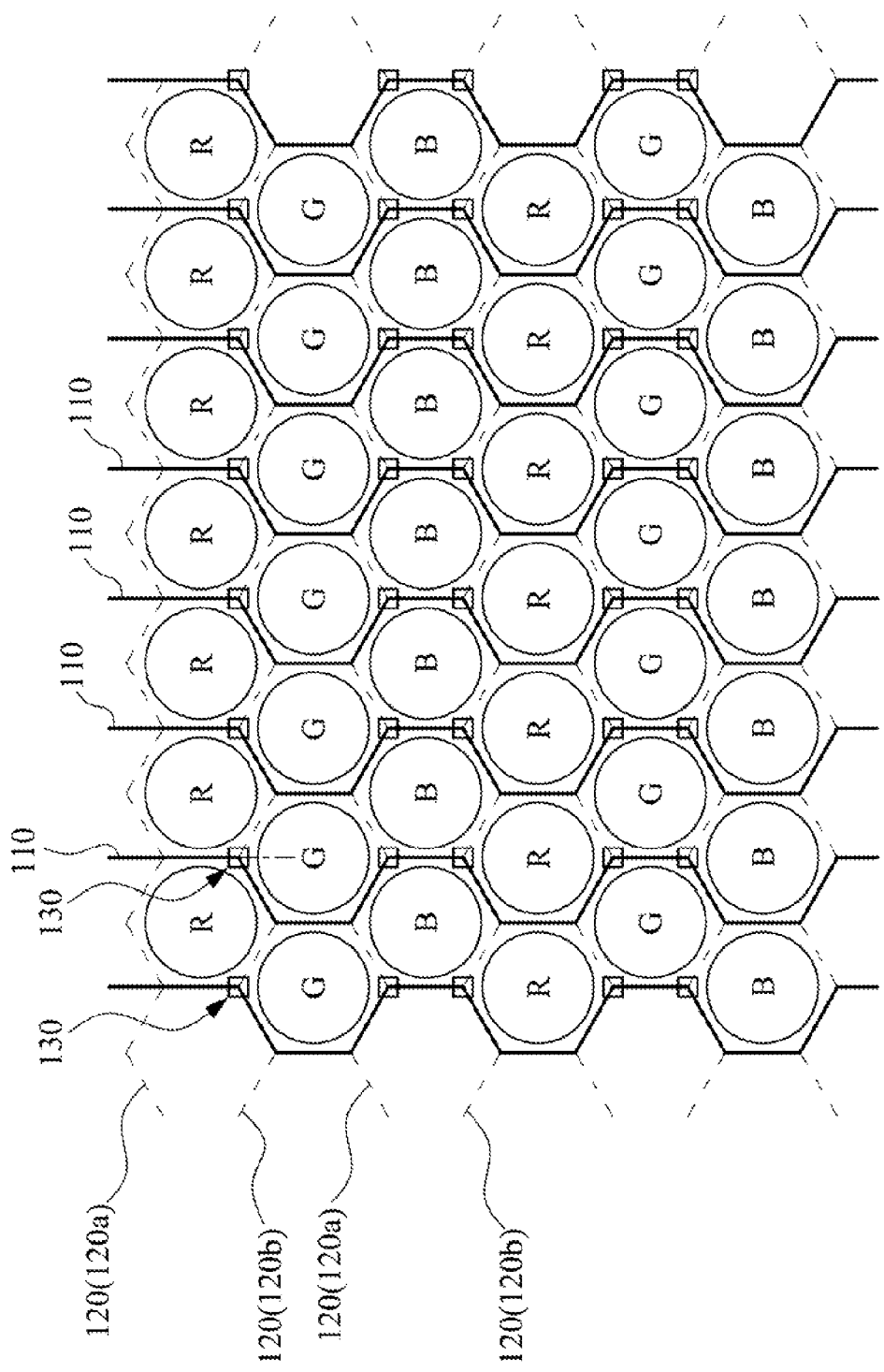
FIG. 1D is top view schematically illustrating an electrophoretic display device. according to another embodiment of the present disclosure.
Figure 1F:
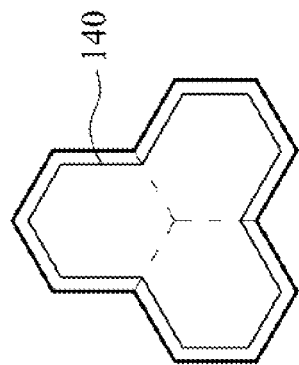
FIG. 1E, FIG. 1F and FIG. 1G are top views schematically illustrating contours consisting of a number of hexagons adjoined together according to various embodiments of the present disclosure.
Figure 1G:
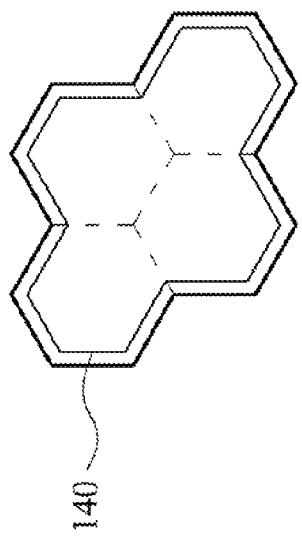
Figure 1E:
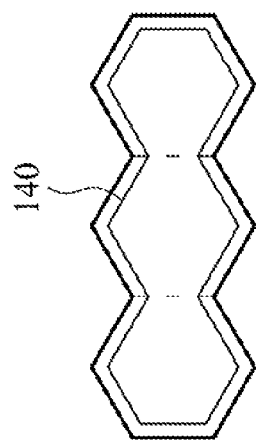

FIG. 1C is an enlarged view schematically illustrating parts of FIG. 1A. As shown in FIG. 1C, each first conductive wires 110 includes a plurality of first segments D1, a plurality of second segments D2, a plurality of third segments D3 and a plurality of fourth segments D4. Each of the first segments D1 is substantially parallel to each of the third segments D3. Two ends of each second segment D2 are respectively connected to an end of an adjacent first segment D1 and an end of an adjacent third segment D3. Furthermore, each second segment D2 forms an included angle of about 120 degrees with the adjacent first segment D1, and also forms an included angle of about 120 degrees the adjacent third segment D1 Similarly, two ends of each fourth segment D4 are respectively connected to an end of an adjacent first segment D1 and an end of an adjacent third segment D3. Furthermore, each fourth segment D4 forms an included angle of about 120 degrees with the adjacent first segment D1, and further forms an included angle of about 120 degrees with the adjacent third segment D3. In addition, each of the second conductive wires 120 includes a plurality of fifth segments D5 and a plurality of sixth segments D6, and each of the fifth segments D5 and each of the sixth segments D6 are alternately arranged. Two ends of each fifth segment D5 are respectively connected to the ends of two adjacent sixth segments D6, and further the each fifth segment D5 forms included angles of about 120 degrees with the adjoining sixth segments D6. Thereby, according to some embodiments of the present disclosure, the projections of the first conductive wires 110 and the second conductive wires 120 on the principal surface 102s constitute or construct a plurality of geometric patterns, and each of the geometric patterns is a hexagon or a contour consisting of a plurality of hexagons adjoined together. In one embodiment, as shown in FIG. 1C, the projections of the first conductive wires 110 and the second conductive wires 120 on the principal surface constitute at least one decagon (i.e., a polygon with 10 sides and 10 angles) consisting of two adjoining hexagons. In another embodiment, as shown in FIG. 1D, the projections of the first conductive wires 110 and the second conductive wires 120 on the principal surface form a plurality of repeated regular hexagons. In still another embodiment, as shown in FIG. 1E, the projections of the first conductive wires 110 and the second conductive wires 120 on the principal surface 102s construct at least one tetra-decagon (i.e., a polygon with 14 sides and 14 angles) consisting of three hexagons adjoined together, In still another embodiment, as shown in FIG. 1F, the projections of the first conductive wires 110 and the second conductive wires 120 on the principal surface constitute at least one dodecagon (i.e., a polygon with 12 sides and 12 angles) consisting of three hexagons adjoined together. In other embodiments, as shown in FIG. 1G, the projections of the first conductive wires 110 and the second conductive wires 120 on the principal surface form at least one tetradecagon consisting of four hexagons adjoined together.

Referring back to FIG. 1A and FIG. 1C, the depicted second conductive wires 120 may be classified into two groups, i.e., the group of second conductive wires 120a and the group of second conductive wires 120b. It is noted that each second conductive wire 120a and each second conductive wire 120b are mirror symmetric to each other. The second conductive wires 120a are not completely identical to the second conductive wires 120b in the plan view. Therefore, one of the second conductive wires 120a and 120b may be named or considered as a third electrode wire.

The electrophoretic display device 100 further includes a plurality of active devices 130, as shown in FIG. 1A and FIG. 1C. Each active device 130 is electrically connected to one of the first conductive wires 110 and one of the second conductive wires 120. In one embodiment, the active devices 130 are thin-film transistors, and are arranged at the intersections of the first conductive wires 110 and the second conductive wires 120.

The electrophoretic display device 100 further includes a plurality of pixel electrodes 140, as shown in FIG. 1C. Each pixel electrode 140 is electrically connected to one of the active devices 130, and each pixel electrode 140 is positioned in one of the geometric patterns constituted by the first conductive wires 110 and second conductive wires 120. According to various embodiments of the present disclosure, the plan view or top view of the pixel electrode 140 is substantially a hexagon or a contour constructed of a plurality of hexagons adjoined together, as shown in FIG. 1E, FIG. 1F and FIG. 1G.

Figure 2:
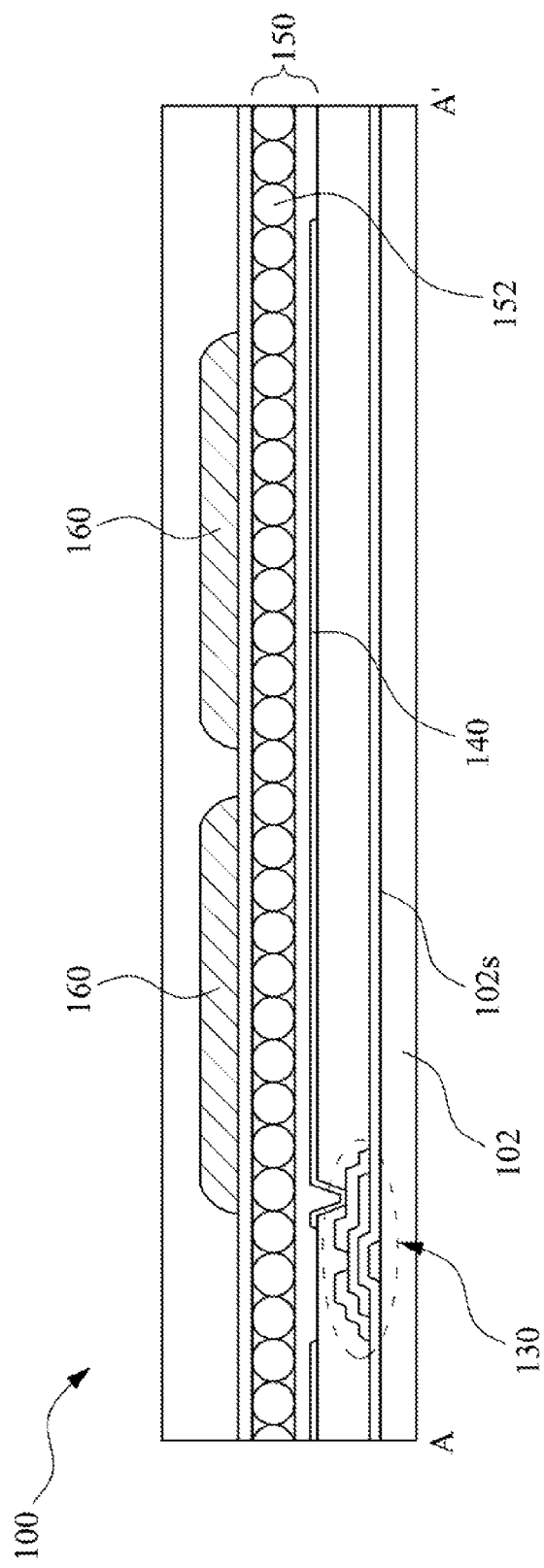
FIG. 2 is a cross-sectional view along line AA' in FIG. 1A.

FIG. 2 is a cross-sectional view along line AA' in FIG. 1A, As showing in FIG. 2, the electrophoretic display device 100 further includes an electrophoretic layer 150 and a color resist layer 160. The electrophoretic layer 150 is positioned over the pixel electrode 140. The displaying status of the electrophoretic layer 150 may be regulated according to the electric field provided by the pixel electrode 140. The electrophoretic layer 150 is not limited to specific types, so long as it may display different colors or exhibit different optical properties according to the electric field. In one example, the electrophoretic layer 150 includes a plurality of electrophoretic display units, which may be microcup electrophoretic units or microcapsules electrophoretic units, for example.

Figure 3:
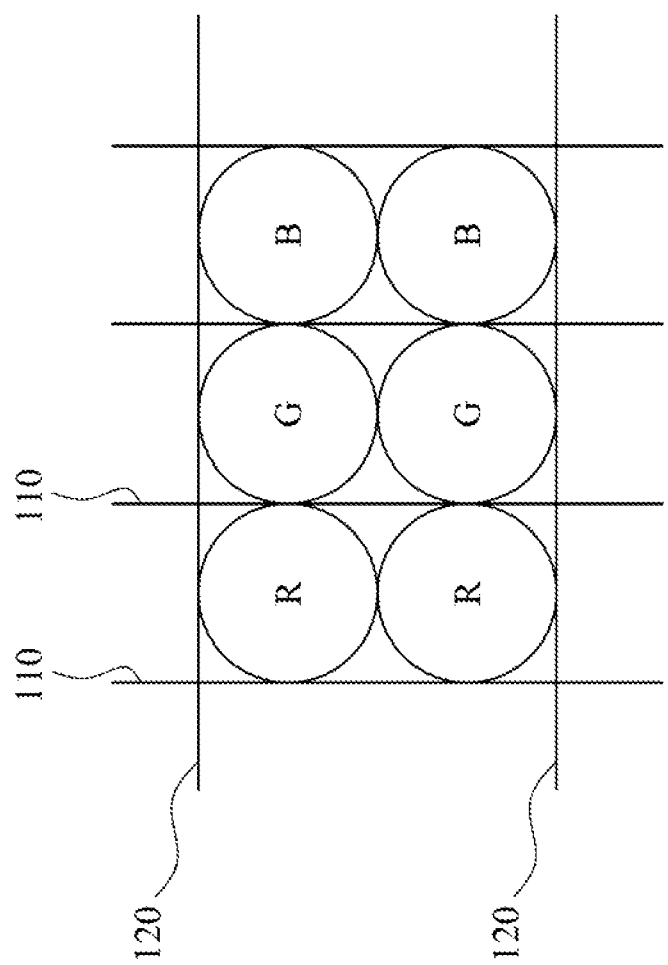
FIG. 3 is a top view showing a comparative example of the present disclosure.

The color resist layer 160 is disposed over the electrophoretic layer 150, and includes a plurality of color resist patterns R, G, B (shown in FIG. 1A). In some embodiments, the color resist layer 160 is formed by ink-jet printing techniques, and therefore the top view of each color resist pattern R, G, B is substantially in a shape of circle, ellipse or the like. According to some embodiments of the present disclosure, the electrophoretic devices disclosed herein are especially suitable for this kind of color resist layer 160 since the first conductive wires 110 and the second conductive wires 120 form geometric patterns such as hexagons or contours constructed of a plurality of hexagons adjoined together. In specifies, according to some embodiments of the present disclosure, each pixel or sub-pixel is in a shape of hexagon or a contour consisting of a plurality of hexagons adjoined together, and thereby the area ratio of the color resist patterns R, G, B filled in the pixels or sub-pixels may be increased, and leading to an increase in the color saturation and/or color gamut of the electrophoretic display device 100. The diameter of each color resist pattern R, G, B may be, for example, about 50 μm to about 180 μm, The thickness of each color resist pattern R, G, B may be, for example. about 1 μm to about 10 μm. FIG. 3 is a top view showing a comparative example of the present disclosure. In this comparative example, the shape of pixels or sub-pixels is rectangular, so that the area ratio of the color resist patterns R, G, B filled in the pixels or sub-pixels is relatively low, and that results in an unsatisfied color saturation and/or color gamut of the electrophoretic display device.

Figure 4:
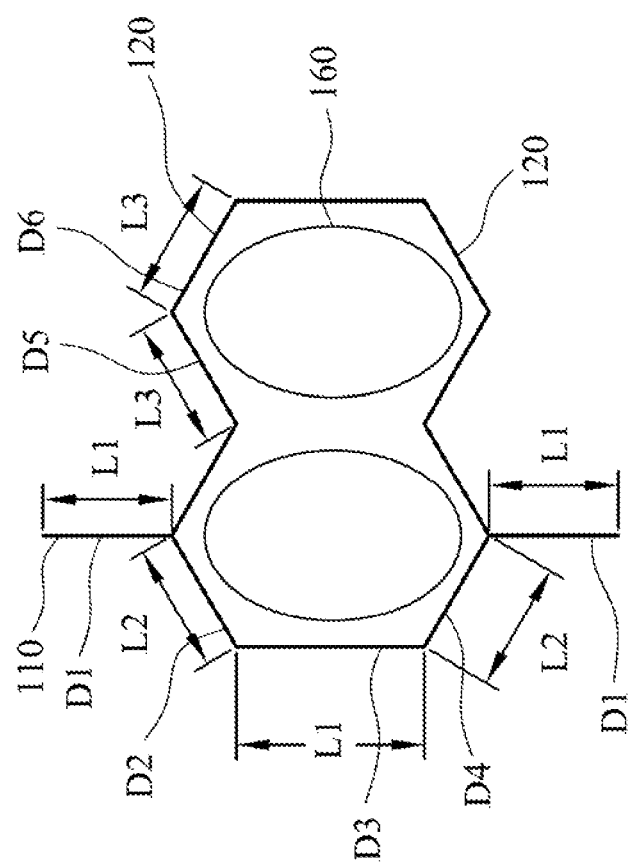
FIG. 4 is a top view schematically illustrating a portion of an electrophoretic display device according to another embodiment of the present disclosure.

The hexagon discussed in the present disclosure is not limited to a regular hexagon. FIG. 4 is a top view schematically illustrating a portion of an electrophoretic display device according to another embodiment of the present disclosure. In this embodiment, each of the first segments D1 and the third segments D3 of the first conductive wire 110 has a substantially identical length L1. and additionally each of the second segments D2 and the fourth segments D4 has a substantially identical length L2. Nevertheless, the length L1 of the first segments D1 and the third segments D3 is greater than the length L2 of the second segments D2 and the fourth segments D4. In examples, the length L1 of the first segments D1 is about 1.1 to about 1.6 fold of the length L2 of the second segments D2. Additionally, each of the fifth segments D5 and the sixth segments D6 of the second conductive wire 120 has a substantially identical length L3. In yet some examples, the length L3 of the fifth segments D5 and the sixth segments D6 is substantially equal to the length L2 of the second segments D2 and the fourth segments D4. In various embodiments, each color resist pattern of the color resist layer 160 has an elliptical Shape or ellipse-liked shape, and therefore the embodiment depicted in FIG. 4 is suitable for elliptical or ellipse-liked color resist patterns.

Figure 5A:
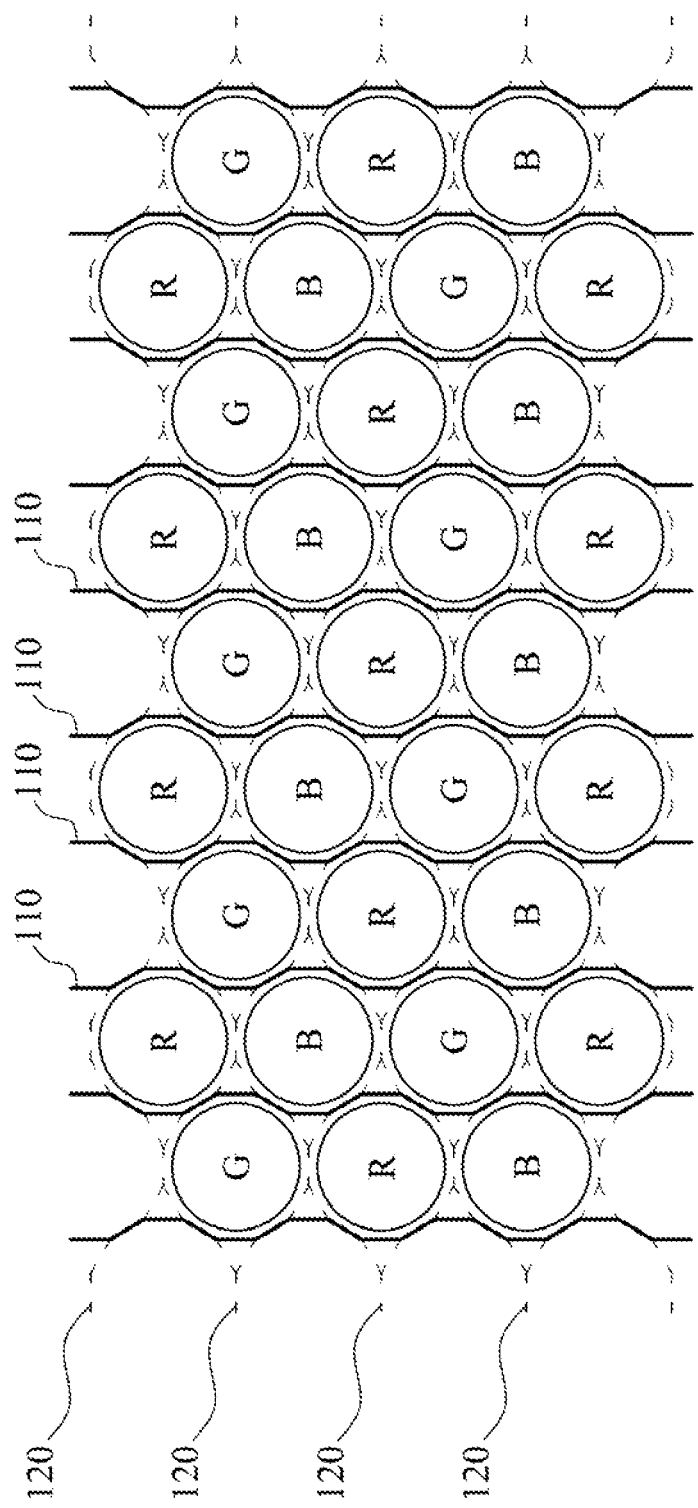
FIG. 5A and FIG. 5B are top views schematically illustrating an electrophoretic display device according to still another embodiment of the present disclosure.
Figure 5B:
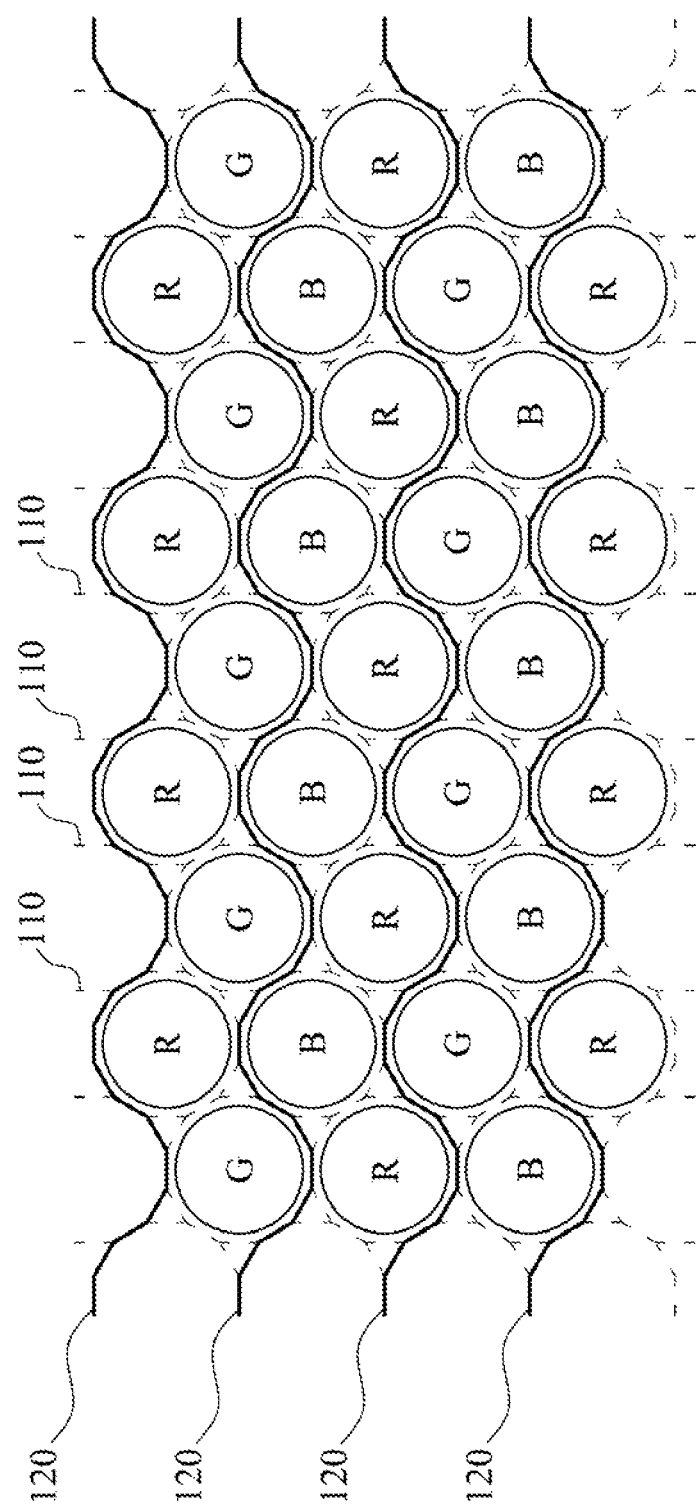
Figure 5C:
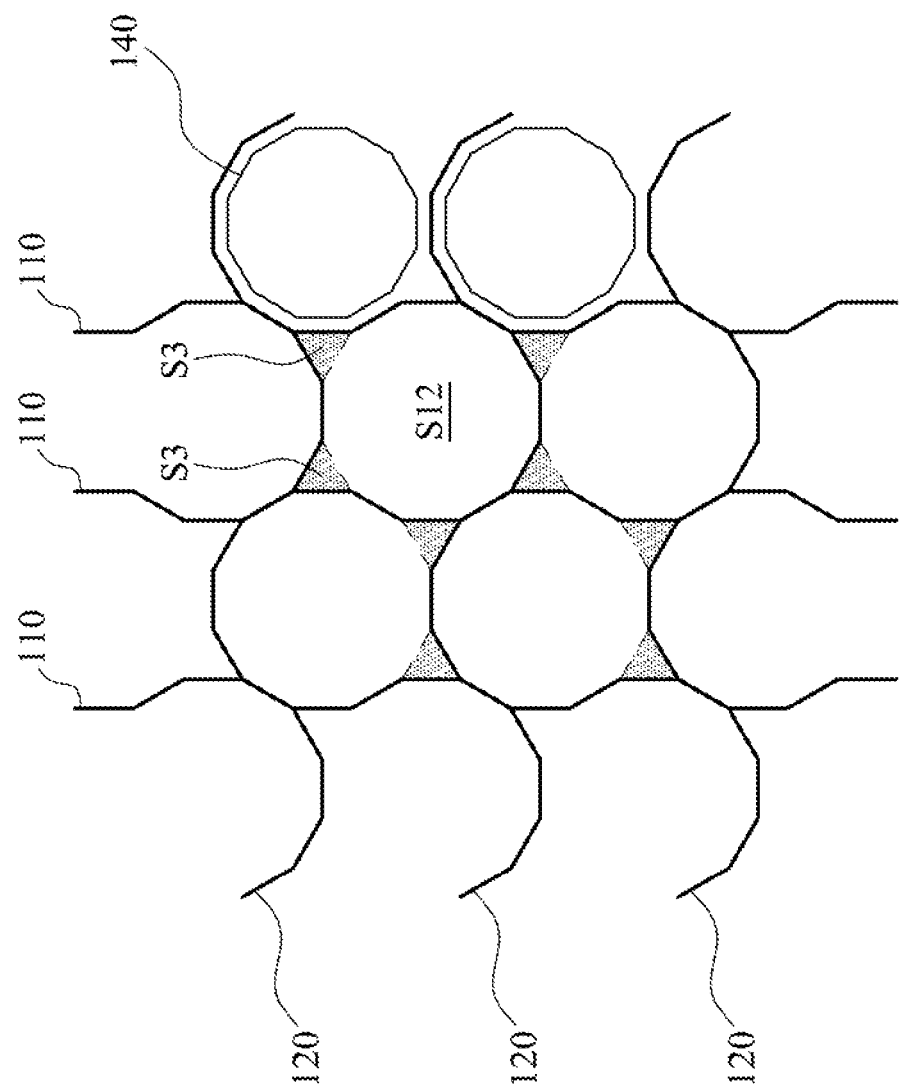
FIG. 5C shows the geometric patterns of the projections of the first and second conductive wires on the principal surface of the substrate according to still another embodiment of the present disclosure.

FIG. 5A and FIG. 5B are top views schematically illustrating an electrophoretic display device according to still another embodiment of the present disclosure. The embodiment depicted in FIG. 5a and FIG. 5B differs from the embodiments described hereinbefore in the projected pattern of the first and second conductive wires 110, 120 on the principal surface 102s of the substrate 102. For the purpose of clearly illustrating the layout of the first conductive wires 110 and the second conductive wires 120 in this embodiment, the first conductive wires 110 in FIG. 5A are shown by solid lines whereas the second conductive wires 120 are depicted by dotted lines. in FIG. 5B, the second conductive wires 120 are shown by solid lines, and the first conductive wires 110 are shown by dotted lines. FIG. 5C shows the geometric patterns formed of the projections of the first and second conductive wires 110, 120 on the principal surface 102s of the substrate 102. It is observed in FIG. 5C that the projections of the first conductive wires 110 and the second conductive wires 120 on the principal surface 102s constitute a number of geometric patterns, in which each geometric pattern has a contour consisting of a regular dodecagon S12 and two equilateral triangles S3. In one example, the active device of the electrophoretic display device is disposed in one of the equilateral triangles S3. in another example, the top view or plan view of the pixel electrodes 140 is in a shape of regular dodecagon, as shown in FIG. 5C, Other features and details of the embodiment depicted in FIG. 5A and FIG. 5B, such as the substrate, active device, electrophoretic layer and color resist layer, may be the same as these described hereinbefore in connection with FIG. 1A and FIG. 2, and the detail descriptions thereof are omitted to avoid repetition.

Figure 5D:
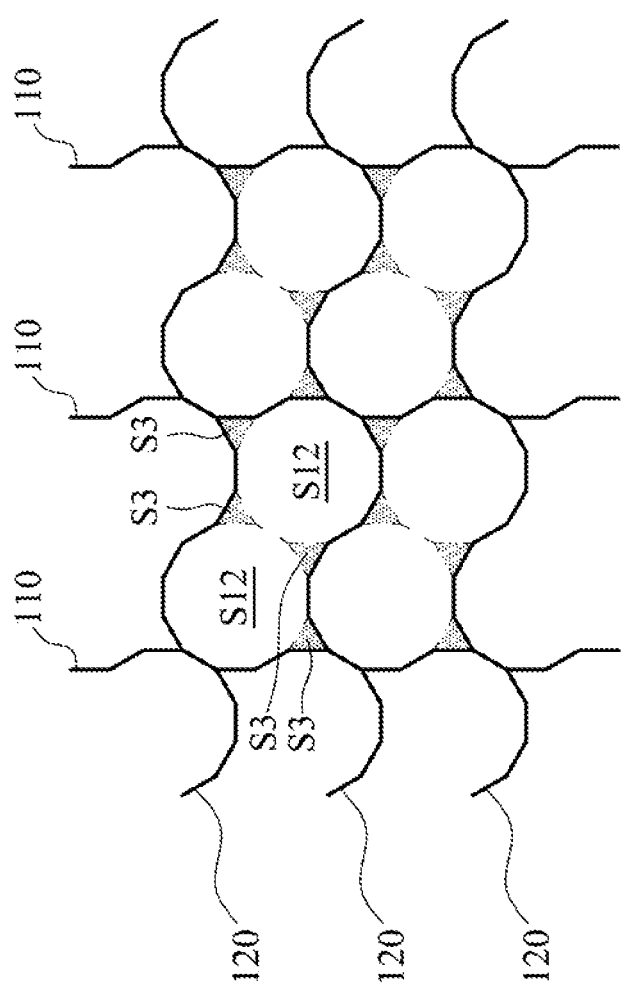
FIG. 5D shows the geometric patterns of the projections of the first and second conductive wires on the principal surface of the substrate according to still another embodiment of the present disclosure.

FIG. 5D shows the geometric patterns of the projections of the first and second conductive wires 110, 120 on the principal surface 102s, according to still another embodiment of the present disclosure. As shown in FIG. 5D, the projections of the first conductive wires 110 and the second conductive wires 120 on the principal surface 102s constitute a number of geometric patterns, in which each geometric pattern has a contour consisting of two adjoining regular dodecagons S12 and four equilateral triangles S3 arranged in a way that may constructs a tessellation.

Figure 5E:
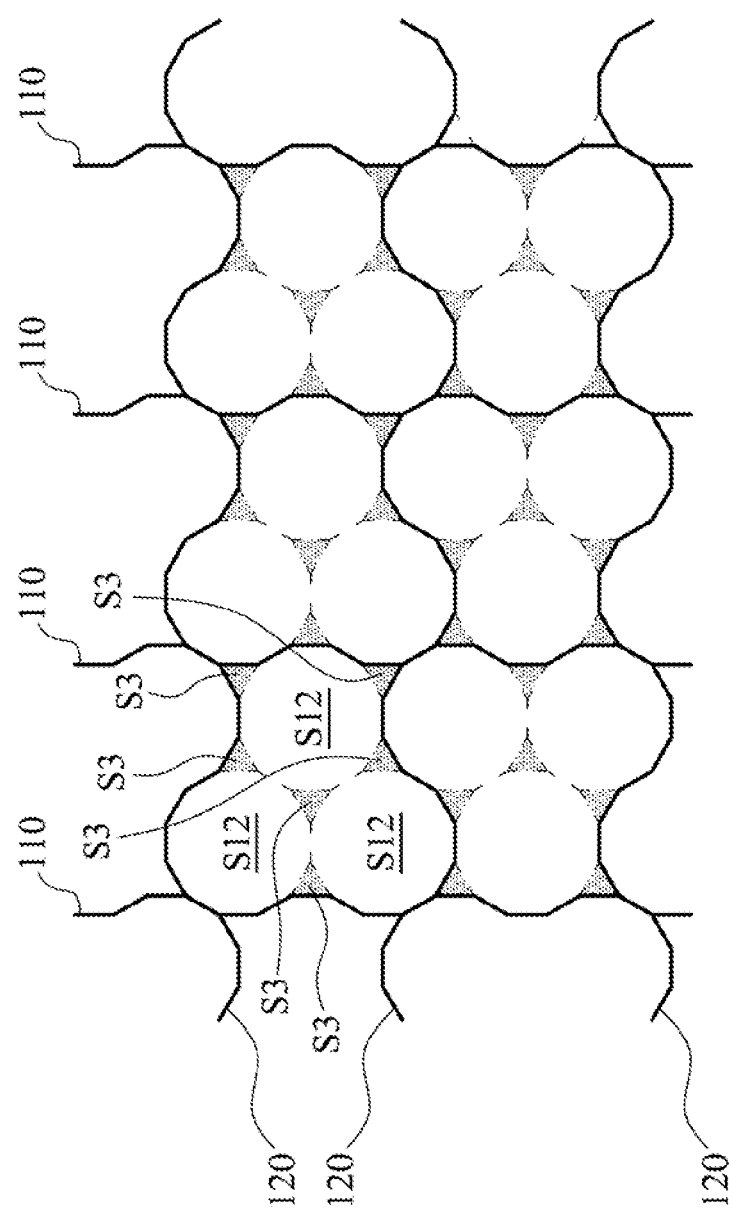
FIG. 5E shows the geometric patterns of the projections of the first and second conductive wires on the principal surface of the substrate according to still another embodiment of the present disclosure.

FIG. 5E shows the geometric patterns of the projections of the first and second conductive wires 110, 120 on the principal surface 102s, according to still another embodiment of the present disclosure. As shown in FIG. 5D, the projections of the first conductive wires 110 and the second conductive wires 120 on the principal surface 102s constitute a number of geometric patterns, in which each geometric pattern has a contour consisting of three adjoining regular dodecagons S12 and six equilateral triangles S3 arranged in a way that constructs a tessellation. Therefore, according to various embodiments of the present disclosure described above, the projections of the first conductive wires 110 and the second conductive wires 120 on the principal surface 102s constitute a number of geometric patterns, and each geometric pattern has a contour formed of at least one regular dodecagon and a plurality of equilateral triangles arranged in a way that may construct a tessellation.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims and their equivalents.

What is claimed is:

1. An electrophoretic display device, comprising:
a substrate having a principal surface;
a plurality of first conductive wires disposed over the principal surface of the substrate;
a plurality of second conductive wires disposed over the principal surface of the substrate and crossing over the first conductive wires, wherein projection of the two adjacent first conductive wires and the two adjacent second conductive wires on the principal surface constitute a geometric pattern, wherein the geometric pattern is a regular hexagon or a contour constructed of a plurality of regular hexagons adjoined together;
a plurality of active devices, each of the active devices being electrically connected to one of the first conductive wires and one of the second conductive wires;
a plurality of pixel electrode, each of the pixel electrodes being electrically connected to one of the active devices;
an electrophoretic layer positioned over the pixel electrodes; and
a color resist layer positioned over the electrophoretic layer.

2. An electrophoretic display device, comprising:
a plurality of first conductive wires, wherein each of the first conductive wires comprises a plurality of first segments, a plurality of second segments, a plurality of third segments and a plurality of fourth segments, each first segment being substantially parallel to each third segment, wherein two ends of each second segment are respectively connected with an end of each first segment and an end of each third segment, each second segment and each first segment connected thereto form an included angle of about 120 degrees, and each second segment and each third segment connected thereto form an included angle of about 120 degrees, wherein two ends of each fourth segment are respectively connected with an end of each first segment and an end of each third segment, each fourth segment and each first segment connected thereto form an included angle of about 120 degrees, and each fourth segment and each third segment form an included angle of about 120degrees;
a plurality of second conductive wires, wherein each of the second conductive wires comprises a plurality of fifth segments and a plurality of sixth segments, wherein two ends of each fifth segment are respectively connected to two adjacent ones of the sixth segments, and each fifth segment and each sixth segment connected thereto form an included angle of about 120 degrees, wherein projection of the two adjacent first conductive wires and the two adjacent second conductive wires constitute a geometric pattern, wherein the geometric pattern is a hexagon or a contour constructed of a plurality of hexagons adjoined together;
a plurality of active devices electrically connected to the first conductive wires and the second conductive wires;
a plurality of pixel electrodes electrically connected to the active devices;
an electrophoretic layer positioned over the pixel electrodes; and
a color resist layer positioned over the electrophoretic layer.

3. The electrophoretic display device according to claim 2, wherein the first conductive wire is a data line, and the second conductive wire is a gate line.

4. The electrophoretic display device according to claim 2, wherein the first conductive wire is a gate line, and the second conductive wire is a data line.

5. The electrophoretic display device according to claim 2, wherein the color resist layer comprises a plurality of color resist patterns, and each of the color resist patterns has a circle-liked contour or an ellipse-liked contour.

6. The electrophoretic display device according to claim 2, further comprising a third electrode wire, and the third electrode wire is mirror symmetric to the second conductive wire.

7. The electrophoretic display device according to claim 2, wherein each of the first segments and each of the third segments are of substantially equal length, and each of the second segments and each of the fourth segments are of substantially equal length.

8. The electrophoretic display device according to claim 2, wherein each of the fifth segments and each of the sixth segments are of substantially equal length.

9. The electrophoretic display device according to claim 2, wherein the pixel electrode has a pattern of a hexagon or a contour consisting of a plurality of hexagons adjoined together.

10. An electrophoretic display device, comprising:
a substrate having a principal surface;
a plurality of first conductive wires disposed over the principal surface of the substrate;
a plurality of second conductive wires disposed over the principal surface of the substrate and crossing over the first conductive wires, wherein projection of the two adjacent first conductive wires and the two adjacent second conductive wires on the principal surface constitute a geometric pattern, wherein the geometric pattern is constructed of at least one regular dodecagon and a plurality of equilateral triangles arranged in a way constructing a tessellation;
a plurality of active devices, each of the active devices being electrically connected to one of the first conductive wires and one of the second conductive wires;
a plurality of pixel electrode, each of the pixel electrodes being electrically connected to one of the active devices;
an electrophoretic layer positioned over the pixel electrodes; and
a color resist layer positioned over the electrophoretic layer.

* * * * *